United States Patent [19]

Morimoto et al.

[11] Patent Number: 5,362,689
[45] Date of Patent: * Nov. 8, 1994

[54] INFRARED AND ULTRAVIOLET RAY ABSORBING GLASS

[75] Inventors: Shigeki Morimoto, Mie; Tadashi Noguchi, Matsusaka; Yasusi Taguchi, Matsusaka; Masakazu Taniguchi, Matsusaka, all of Japan

[73] Assignee: Central Glass Company, Ltd., Yamaguchi, Japan

[ * ] Notice: The portion of the term of this patent subsequent to Jun. 14, 2011 has been disclaimed.

[21] Appl. No.: 112,913

[22] Filed: Aug. 27, 1993

Related U.S. Application Data

[63] Continuation of Ser. No. 794,908, Nov. 20, 1991, abandoned.

[30] Foreign Application Priority Data

| Nov. 26, 1990 | [JP] | Japan | 2-321465 |
| Dec. 25, 1990 | [JP] | Japan | 2-405840 |
| Jun. 17, 1991 | [JP] | Japan | 3-144927 |
| Jun. 17, 1991 | [JP] | Japan | 3-144928 |

[51] Int. Cl.⁵ ............... C03C 3/087; C03C 4/10
[52] U.S. Cl. ............. 501/70; 501/72; 501/904; 501/905
[58] Field of Search ........... 501/10, 55, 68, 69, 501/70, 72, 904, 905; 252/584, 587, 588; 428/426; 423/335, 331, 332, 532, 598, 600, 605, 610, 623

[56] References Cited

U.S. PATENT DOCUMENTS

| 2,860,059 | 11/1958 | Molter et al. | 106/52 |
| 4,285,728 | 8/1981 | Babcock et al. | 501/10 |
| 4,701,425 | 10/1987 | Baker et al. | 501/70 |
| 4,792,536 | 12/1988 | Pecoraro | 501/70 |
| 5,013,487 | 5/1991 | Cheng | 252/587 |
| 5,030,593 | 7/1991 | Heithoff | 501/72 |
| 5,069,826 | 12/1991 | Cheng | 252/587 |
| 5,071,796 | 12/1991 | Jones et al. | 501/70 |
| 5,077,133 | 12/1991 | Cheng | 428/426 |

FOREIGN PATENT DOCUMENTS

2162835A 2/1986 United Kingdom .

OTHER PUBLICATIONS

W. A. Weyl, "Coloured Glasses," Society of glass technology, 1967, pp. 115–116.
Chem. Abstr., vol. 59, No. 8(1963) col. 8459.
Kocik et al.; Sprechsaal, vol. 120, No. 7 Germany (1987), 586–588 Beispiele der Zusammensetzung von Fabgläsern.
Kocik et al.; Sprechsaal, vol. 121, No. 1, Germany (1988), 42–44 Beispiele der Zusammensetzung von Farbgläsern.

Primary Examiner—Karl Group
Assistant Examiner—Michael Marcheschi
Attorney, Agent, or Firm—Keck, Mahin & Cate

[57] ABSTRACT

An infrared and ultraviolet ray absorbing glass suitable for use in building and vehicle windows, which comprises, on a weight basis, 68–72% $SiO_2$, 1.6–3.0% $Al_2O_3$, 8.5–11.0% CaO, 2.0–4.2% MgO, 12.0–16.0% $Na_2O$, 0.5–3.0% $K_2O$, 0.08–0.30% $SO_3$, 0.58–0.80% total iron expressed as $Fe_2O_3$, 0.10–0.60% $CeO_2$, 0.10–0.40% $TiO_2$ and 5–350 ppm MnO. In the glass the ratio of ferrous iron to ferric iron is from 0.3 to 0.7. The glass has a greenish tint and is well balanced in visible light transmittance, infrared radiation absorption and ultraviolet radiation absorption. The glass can easily be produced as a sheet glass by the conventional float process without significantly varying the melting and refining operation conditions, and the glass sheet can readily be tempered by a conventional method.

15 Claims, No Drawings

INFRARED AND ULTRAVIOLET RAY ABSORBING GLASS

This is a continuation of application Ser. No. 07/794,908 filed Nov. 20, 1991, now abandoned.

BACKGROUND OF THE INVENTION

This invention relates to an infrared and ultraviolet ray absorbing glass which retains sufficiently high visible transmittance and can easily be produced by the conventional float process and can easily be tempered by the conventional air quenching method. The glass has a greenish tint and is particularly suitable for use in building and vehicle windows.

For windows of buildings and automobiles and other vehicles, there is an increasing demand for sheet glass that is sufficiently transparent to visible light and possesses the capability to absorb not only infrared rays but also ultraviolet rays. The absorption of infrared radiation in window glasses offers comfort to the occupants or contributes to the saving of energy by reducing the air conditioning load, and the absorption of ultraviolet rays serves for the purpose of improving habitability of the rooms or vehicle cabins and preventing discoloration or deterioration of the interior or onboard articles made of organic materials.

One measure for reducing the transmittance of infrared and/or ultraviolet rays through a glass is to provide the glass with a reflective and/or absorptive coating. However, in many cases it is more desirable to render the glass itself absorptive of infrared and ultraviolet rays by modifying the glass composition. From an industrial point of view it is desired that an infrared and ultraviolet absorbing glass can be produced by a conventional method, and particularly by the conventional float process, without significantly changing the particulars of operations. Also it is desired that an infrared and ultraviolet absorbing glass can easily be toughened by a conventional tempering method.

it is known to render a soda-lime-silica glass absorptive of infrared radiation by incorporating iron in the glass Although ferrous iron $Fe^{2+}$ (expressed as FeO) is particularly effective for infrared absorption, it is usual to produce a glass containing both ferrous iron and ferric iron $Fe^{3+}$ (expressed as $Fe_2O_3$) because if FeO alone is present in a relatively large amount the visible transmittance of the glass and the tint of the glass are unfavorably affected. In practice $Fe_2O_3$ is used as a raw material, and an adequate portion of $Fe_2O_3$ is reduced to FeO during the glassmaking process.

Also it is known to incorporate cerium oxide $CeO_2$ and/or titanium oxide $TiO_2$ in a soda-lime-silica glass to render the glass absorptive of ultraviolet rays.

U.S. Pat. No. 4,792,536 shows an infrared absorbing glass, which can be rendered absorptive of ultraviolet radiation too, and a method of producing same. Basically the glass is a soda-lime-silica glass, and in the glass the content of iron expressed as $Fe_2O_3$ is 0-1 wt %, and preferably 0.45-0.65 wt %, and at least 35% of the total iron is in the ferrous state as FeO. Besides, the glass contains 0-1.5 wt % of at least one of $CeO_2$, $TiO_2$, $V_2O_5$ and $MoO_3$, preferably including 0.25-0.50 wt % of $CeO_2$. An important feature of the glass of this patent is that the residual $SO_3$ content is less than 0.02 wt %. From an industrial point of view the proposal of U.S. Pat. No. 4,792,536 is not favorable because the proposed infrared and ultraviolet absorbing glass cannot be produced by the conventional melting operations in the float process. As is disclosed in the patent specification, due to the very low content of sulfur it is necessary to employ complicated two-stage melting and refining operations by using a special stirring means.

U.S. Pat. No. 4,701,425 shows an infrared and ultraviolet absorbing glass which is basically a soda-lime-silica glass and contains 0.29-0.6 wt % of iron expressed as $Fe_2O_3$, 0.1-1.5 wt % of $SnO_2$ and 0.1-1.6 wt % of $TiO_2$. It is permitted that the glass contains up to 0.5 wt % of $SO_3$. However, this glass is low in the absorption of ultraviolet rays and insufficient in the capability to absorb infrared radiation, and it is difficult to desirably temper this glass by a conventional method.

SUMMARY OF THE INVENTION

It is an object of the present invention to provide an infrared and ultraviolet ray absorbing glass, which is well balanced in visible light transmittance, infrared radiation absorption and ultraviolet radiation absorption and can be produced by the conventional float process without significantly varying the melting and refining operation conditions and can readily be tempered by a conventional tempering method.

The present invention provides an infrared and ultraviolet ray absorbing glass, which comprises as essential components, on a weight basis, 68–72% of $SiO_2$, 1.6–3.0% of $Al_2O_3$, 8.5–11.0% of CaO, 2.0–4.2% of MgO, 12.0–16.0% of $Na_2O$, 0.5–3.0% of $K_2O$, 0.08–0.30% of $SO_3$, 0.58–0.80% of total iron expressed as $Fe_2O_3$, 0.10–0.60% of $CeO_2$, 0.10–0.40% of $TiO_2$ and 5–350 ppm of MnO, with provisos that the total of the essential components amounts to at least 98 wt % of the glass, that the total amount of $SiO_2$, $Al_2O_3$ and $TiO_2$ is from 70.0 to 74.0%, that the total amount of CaO and MgO is from 12.0 to 15.0% and that the total amount of $Na_2O$ and $K_2O$ is from 13.0 to 17.0% and that the total iron includes both ferrous iron and ferric iron.

A glass according to the invention is relatively high in Young's modulus, Poisson's ratio and thermal expansion coefficient and relatively low in heat conductivity. This glass is sufficiently transparent and has a greenish tint.

As to the optical characteristics of a glass according to the invention, at a thickness of 5 mm the glass is not lower than 67% in visible light transmittance using the standard illuminant A, from 30 to 47% in total solar radiation transmittance, from 7 to 15% in ultraviolet radiation transmittance, from 505 to 518 nm in dominant wavelength and not higher than 5.5 in excitation purity. These optical characteristics are very favorable for application of the glass to building and vehicle windows and particularly to automobile windows or windshields.

A glass of this invention is a modification of a soda-lime-silica glass. According to the invention the glass is rendered adequately absorptive of infrared and ultraviolet rays without unduly sacrificing visible light transmittance by carefully and strictly specifying the proportions of the fundamental components of soda-lime-silica glass and additionally incorporating relatively small and strictly specified amounts of iron oxide, cerium oxide and titanium oxide together with a very small amount of manganese oxide. Preferred embodiments of the invention include a glass containing 0.65–0.75 wt % of total iron expressed as $Fe_2O_3$, 0.20–0.35 wt%% of $CeO_2$ and 0.10–0.20 wt % of $TiO_2$, a glass containing 0.58–0.65 wt % of total iron expressed as $Fe_2O_3$, 0.10–0.50 wt % of $CeO_2$ and 0.10–0.40 wt % of $TiO_2$, and a glass containing 0.65–0.80 wt % of total iron expressed as $Fe_2O_3$, 0.35–0.60 wt % of $CeO_2$ and 0.15–0.40 wt % of $TiO_2$.

In a glass according to the invention the ratio of ferrous iron to ferric iron is from 0.30 to 0.70, which means that in this invention the degree of reduction of iron does not significantly differ from the values in the conventional iron-containing glasses, and the glass contains an adequate amount of sulfur. Therefore, in industrially producing this glass it is not necessary to greatly change the conditions of the conventional melting, refining and clarifying operations. As a sheet glass this glass can be produced by the conventional float process without problem.

In another aspect, it is an important advantage of the invention that the infrared and ultraviolet absorbing glass can easily be tempered to a desired degree by a conventional method such as air quenching method. A tempered glass according to the invention is very suitable for use in automobile windshields.

A glass according to the invention can be formed into glass sheets of various thicknesses, for example, ranging from about 1 mm to about 10 mm, and according to the need the glass sheets can be bent and/or tempered. Besdies, a glass according to the invention can be used as a component of laminated glass or insulated glass. Needless to mention it is optional to use a glass according to the invention for various articles other than window glasses, such as furniture and cooking utensils for example.

DESCRIPTION OF THE PREFERRED EMBODIMENTS

Basically an infrared and ultraviolet absorbing glass according to the invention is a soda-lime-silica glass. The fundamental components of the glass are $SiO_2$, $Al_2O_3$, CaO, MgO, $Na_2O$ and $K_2O$, and the proportions of these components are strictly limited in order that the glass should easily be produced by the conventional float process and should possess desirable properties including good weatherability and good temperability.

The glass contains 88 to 72 wt % of $SiO_2$ together with 1.6 to 3.0 wt % of $Al_2O_3$. If $SiO_2$ is less than 68% or $Al_2O_3$ is less than 1.6% the glass is not always good in weatherability and may exhibit tanning by long exposure to sunlight. If $SiO_2$ exceeds 72% the glass composition becomes inferior in meltability, and the glass may not be good in temperability. If $Al_2O_3$ exceeds 3.0% the glassmaking operations encounter difficulty because of the likelihood of devitrification and narrowing of the range of temperature for forming the glass. Furthermore, in the glass the total amount of $SiO_2$, $Al_2O_3$ and $TiO_2$ is limited within the range from 70.0 to 74.0 wt %. As will be described hereinafter $TiO_2$ is one of the important additives and amounts to 0.1–0.4 wt % of the glass. If the total of these three components is less than 70% the glass is not always good in weatherability, and if it exceeds 74% the glass may not be good in temperability.

The glass contains 8.5 to 11.0 wt % of CaO and 2.0 to 4.2 wt % of MgO. These components contribute to a reduction in the melting temperature of the glass composition. If CaO is less than 8.5% or MgO is less than 2.0% the melting temperature is not sufficiently low, and the flow point of the glass is not desirably low particularly in the case of shortage of CaO. If CaO exceeds 11.0% the glassmaking operations encounter difficulty because of the likelihood of devitrification. If MgO exceeds 4.2% the glass may not be good in temperability. In the glass the total amount of CaO and MgO is limited within the range from 12.0 to 15.0 wt %. If the total of these two components is less than 12% the glass is not good in temperability, and if it exceeds 15% restrictions are placed on the glassmaking operations because of a tendency to devitrification.

The glass contains 12.0 to 16.0 wt % of $Na_2O$ together with 0.5 to 3.0 wt % of $K_2O$. If $Na_2O$ is less than 12% difficulty arises in the glassmaking operations because of a tendency to devitrification and a narrowed range of temperature for forming the glass, and the glass is not good in temperability. If $Na_2O$ exceeds 16% the glass is not always good in weatherability and may exhibit tanning. If $K_2O$ is less than 0.5% the glass may not be good in temperability, and if it exceeds 3% the glass may not be good in weatherability. In the glass the total amount of $Na_2O$ and $K_2O$ is limited within the range from 13.0 to 17.0 wt %. If the total of these two components is less than 13% difficulty arises in the glassmaking operations because of the likelihood of devitrification and narrowing of the range of operating temperature, and the glass is not good in temperability, and if it exceeds 17% the glass may not be good in weatherability.

A glass according to the invention always contains a limited amount of sulfur which is known to serve as a melting and refining aid. The glass contains 0.08 to 0.30 wt % of sulfur expressed as $SO_3$. If the residual $SO_3$ content is less than 0.08% it is difficult to accomplish uniform melting and defoaming of the glass by conventional operations. If the residual $SO_3$ content exceeds 0.3% the glass tends to exhibit a yellowish or amber tint instead of a desired greenish tint. It is preferable that the $SO_3$ content is relatively low and ranges from about 0.10 wt % to about 0.18 wt %.

The essential components of a glass according to the invention include limited amounts of iron (expressed as $Fe_2O_3$ for convenience.), $CeO_2$ and $TiO_2$ and a trace of MnO. These additives are employed for desirably modifying the coloration and optical characteristics of the glass.

In the glass the amount of total iron expressed as $Fe_2O_3$ is from 0.58 to 0.80 wt %. If total iron is less than 0.58 wt % it is difficult to sufficiently reduce the infrared and ultraviolet transmittance through the glass, and if it exceeds 0.80 wt % the glass becomes too low in visible transmittance and takes on an undesirably dark tint. When it is desired that the glass has a moderately greenish tint it is suitable to make the total iron content more than about 0.65 wt %. When a relatively palely greenish tint is desired the total iron content is decreased to less than 0.65 wt %. In general it is preferable to control the total iron content in the range from 0.60 to 0.71 wt %.

More particularly, the glass must contain both ferrous iron expressed as FeO and ferric iron expressed as $Fe_2O_3$. FeO efficiently absorbs infrared radiation, but a high content of FeO causes the color of the glass to change to dark green or bluish green. $Fe_2O_3$ is absorptive of ultraviolet rays and significantly influences the coloration of the glass. In a batch of glass composition for producing the infrared and ultraviolet absorbing glass most of iron is in the ferric state, $Fe_2O_3$. When the glass batch is melted a portion of total iron is reduced to the ferrous state, FeO, while the rest remains $Fe_2O_3$. The degree of reduction of iron is an important factor in the glassmaking operations. Herein, the "degree of reduction" refers to the weight ratio of ferrous iron to ferric iron, $Fe^{2+}/Fe^{3+}$, in the glass. The quantity of ferrous iron, $[Fe^{2+}]$, is determined by the quantity of ferrous oxide, [FeO]. Since atomic weight of Fe is 55.85 and molecular weight of FeO is 71.85;

$$[Fe^{2+}] = [FeO] \times 55.85/71.85$$

The quantity of ferric iron, $[Fe^{3+}]$, is determined by the quantity of remaining ferric oxide, $[Fe_2O_3]$, which is calculated from the quantity of total iron [initial $Fe_2O_3$] and [FeO]. Since molecular weight of $Fe_2O_3$ is 159.70;

$$[Fe_2O_3] = [\text{initial } Fe_2O_3] - \{[FeO] \times 159.70/(2 \times 71.85)\} [Fe^{3+}] = [Fe_2O_3] \times (2 \times 55.85)/159.70$$

In conventional commercial furnaces for melting glass to produce a sheet glass by the float process, the degree of reduction of iron is usually from about 0.45 to about 0.70. In the present invention it is intended not to greatly vary the reduction conditions in the conventional commercial furnaces. That is, the invention intends to control the degree of reduction, $Fe^{2+}/Fe^{3+}$, within the range from 0.30 to 0.70, rather preferably within the range from 0.40 to 0.70 and preferably in the range from 0.50 to 0.65. By keeping the degree of reduction in such ranges the melting operation is further facilitated and stabilized. That is, the melting proceeds smoothly without need of using special auxiliary materials or a large amount of reducing agent and without suffering from serious changes in the temperature in the bottom region of the melting furnace, and it becomes possible to increase the rate of outflow of the molten glass. Besides, it becomes easy to obtain an infrared and ultraviolet absorbing glass sheet of good quality with improved stability of the tint of the glass and with little possibility of uneven coloration.

$CeO_2$ and $TiO_2$ are incorporated in the glass as ultraviolet absorbing agents. $CeO_2$ has high ability to absorb ultraviolet rays, and the presence of $CeO_2$ considerably affects the degree of reduction of iron. $TiO_2$ is lower in the ability to absorb ultraviolet rays, but the degree of reduction of iron is not significantly affected by the presence of $TiO_2$. In this invention specific and relatively small amounts of $CeO_2$ and $TiO_2$ are used in combination in order to afford the glass with desirably balanced optical characteristics without greatly varying the degree of reduction of iron in the conventional glass melting furnaces. In the glass the amount of $CeO_2$ is from 0.1 to 0.6 wt %, and the amount of $TiO_2$ is from 0.1 to 0.4 wt %. In many cases it suffices to use a combination of 0.2–0.35 wt % of $CeO_2$ and 0.1–0.2 wt % of $TiO_2$. As mentioned hereinbefore, the total of $SiO_2$, $Al_2O_3$ and $TiO_2$ must amount to 70–74 wt % of the glass.

According to the invention a very small amount of MnO is incorporated in the glass. By the presence of Mn the reduction of iron is slightly affected so that the degree of reduction tends to slightly decrease, while the reduction of cerium is not significantly affected. Besides, MnO serves for minute adjustment of the coloration of the glass containing iron since MnO has an absorption at about 500 nm. The content of MnO is limited within the range from 5 to 350 ppm. If a large amount of MnO is incorporated the glass tends to exhibit undesirable optical characteristics such as, for example, solarization.

The total of the above described essential components must amount to at least 98 wt % of the glass. In other words, it is permissible that the glass incorporates up to 2 wt % of optional and auxiliary components which may be selected from commonly used additives such as ZnO, SnO2, $V_2O_5$, CoO, NiO and Se. In particular, in some cases the addition of up to about 0.25 wt % of $V_2O_5$ is convenient for minute adjustment of the characteristics of the glass because $V_2O_5$ is weakly absorptive of ultraviolet rays and hardly affects the degree of reduction iron. In using $V_2O_5$ care is taken to reduce most of vanadium to trivalent vanadium which exhibits a green color and minimize pentavalent vanadium which exhibits a yellow color.

As to the optical characteristics of an infrared and ultraviolet absorbing glass according to the invention, the glass at a thickness of 5 mm is not lower than 67% in visible light transmittance measured by using CIE standard illuminant A, from 30 to 47% in total solar radiation transmittance, from 7 to 15% in ultraviolet radiation (290–390 nm) transmittance, from 505 to 518 nm in dominant wavelength and not higher than 5.5 in excitation purity. If visible light transmittance is below 67% the glass is unsuitable for automobile windshields because of insufficient visibility through the glass particularly at night or dusk or in rainy days. It is preferable and possible to increase the visible light transmittance to the extent of about 75%. If total solar radiation transmittance is greater than 47% the glass does not sufficiently meet the desire for a reduction in air conditioning loads or an improvement in habitability of rooms or vehicle cabins, and if it is below 30% there will arise problems about visibility through the glass or the tint of the glass. It is preferable that total solar radiation transmittance falls in the range from 35 to 45%. More particularly, for the sake of efficient absorption of thermal radiation it is preferable that an average transmittance in the wavelength range of from 1000 to 1150 nm is not greater than 15%. It is difficult to make the average transmittance concerned less than 6% because visible light transmittance becomes insufficient. If ultraviolet transmittance is greater than 15% the glass, as a window glass, mat not effectively protect the occupants from tanning or the interior plastic articles from discoloration or degradation, and if it is less than 7% the glass will be insufficient in total solar radiation transmittance. It is preferable that ultraviolet transmittance is from about 8% to about 13%.

If the dominant wavelength of the glass is longer than 518 nm the glass takes on a yellowish or ambery tint so that a desired greenish color is not realized, and if it is shorter than 505 nm the glass takes on a bluish green tint. It is preferred to control the dominant wavelength in the range from 507 to 515 nm. If the excitation purity is above 5.5, visibility through the glass is not always sufficient. It is preferable that the excitation purity is below about 4.5.

An infrared and ultraviolet absorbing glass according to the invention can be produced by conventional glass melting and glass forming operations. The raw materials can be selected from commonly used materials. It is favorable to use ilmenite, viz. iron titanate represented by $FeTiO_3$, as a part of iron source and also as a part of titanium source. Since ilmenite essentially consists of FeO and $TiO_2$ the use of ilmenite facilitates incorporation of FeO in the glass without significantly varying the conventional operation conditions of the melting furnace in respect of the degree of reduction of iron. For adjustment of a balance between ferrous iron and ferric iron it is optional to use a small quantity of a reducing agent such as carbon, zinc powder, tin powder, zinc oxide or tin oxide instead of or in addition to the use of ilmenite. Also it is optional to use a conventional clarifying agent.

The following nonlimitative examples are illustrative of the invention.

EXAMPLE 1

As raw materials of glass, silica sand, $Al_2O_3$, $CaCO_3$, $MgCO_3$, $Na_2SO_3$, $KNO_3$, $Fe_2O_3$, $CeO_2$, $TiO_2$, MnO and ilmenite were weighed and mixed together aiming at a prescribed glass composition. The silica sand and ilmenite were of very high purity, and the other materials were all chemical reagents of the first class. The glass composition was formulated such that the viscosity-temperature becomes about 650°–685° C. at $10^9$ poise and about 555°–588° C. at $10^{12}$ poise and such that the difference between the two temperatures becomes about 90°–103° C. With the intention of making the degree of reduction of iron about 0.35, which is only slightly lower than in the conventional melting furnaces, about 0.175 wt % of carbon powder was added to the mixture of raw materials. In a crucible the mixture of raw materials was melted by heating in an electric furnace at about 1450° C. for about 3 hr. After that the molten glass was kept heated at 1420°–1430° C. for about 2 hr for the sake of refining and homogenizing. Then the molten glass was poured into a mold to obtain a glass block. The glass block was cut into glass sheets 100 mm × 100 mm in widths and about 5 mm in thickness, and the glass sheets were ground and polished.

By chemical analysis, the obtained glass contained, on a weight basis, 69.7% $SiO_2$, 1.9% $Al_2O_3$, 9.1% CaO, 3.5% MgO, 13.4% $Na_2O$, 1.0% $K_2O$, 0.695% total iron expressed as $Fe_2O_3$, 0.27% $CeO_2$, 0.15% $TiO_2$, 0.18% $SO_3$ and 108 ppm of MnO. The total of these components amounted to 99.906 wt %. The total of $SiO_2$, $Al_2O_3$ and $TiO_2$ amounted to 71.75 wt %. The total of CaO and MgO amounted to 12.6wt %, and the total of $Na_2O$ and $K_2O$ amounted to 14.4 wt %. The degree of reduction of iron, $Fe^{2+}/Fe^{3+}$, was about 0.33.

The obtained glass had a greenish tint. The optical characteristics of this glass were measured by the methods according to JIS Z 8722, JIS R 3106 and ISO/DIS 9050 by using an automated spectrophotometer. At a thickness of 5 mm, the glass exhibited visible light (standard illuminant A) transmittance of about 70%, total solar radiation transmittance of about 43% and ultraviolet transmittance of about 13%. The dominant wavelength was about 512.2 nm, and the excitation purity was about 2.8.

The viscosity-temperatures of the obtained glass were as aimed, and the difference between the softening temperature and the strain point was about 200°–240° C. For testing temperability the glass was cut into glass sheets 120 mm × 100 mm in widths and about 3.5 mm in thickness, and each glass sheet was tempered by heating in a furnace at about 730° C. for about 5 min and immediately blowing cooling air against the heated glass sheet by a conventional method. The tempered glass sheet was fractured by an impact at a point in a corner region at a distance of about 30 mm from each of the two intersecting sides of the rectangular sheet to examine the manner of fragmentation in respect of the number of fragments and the sizes of the respective fragments. The manner of fragmentation satisfied the requirements of JIS R 3211 for tempered glasses for automobile side and rear windows.

EXAMPLE 2

The glassmaking operations of Example 1 were repeated except that the proportions of the raw materials were varied with the aim of a different glass composition.

The obtained glass contained, on a weight basis, 70.6% $SiO_2$, 1.6% $Al_2O_3$, 9.5% CaO, 2.5% MgO, 13.5% $Na_2O$, 0.9% $K_2O$, 0.687% total iron expressed as $Fe_2O_3$, 0.31% $CeO_2$, 0.17% $TiO_2$, 0.13% $SO_3$ and 80 ppm of MnO. The total of these components amounted to 99.905 wt %. The total of $SiO_2$, $Al_2O_3$ and $TiO_2$ amounted to 72.37 wt %. The total of CaO and MgO amounted to 12.0 wt % and the total of $Na_2O$ and $K_2O$ amounted to 14.4 wt %. The degree of reduction of iron, $Fe^{2+}/Fe^{3+}$, was about 0.33.

The obtained glass had a greenish tint. At a thickness of 5 mm, the glass exhibited visible light (standard illuminant A) transmittance of about 70.5% total solar radiation transmittance of about 42% and ultraviolet transmittance of about 12.5%. The dominant wavelength was about 509.2 nm, and the excitation purity was about 3.0.

The temperability of the obtained glass was tested by the same method as in Example 1. The tempering was accomplished without problem, and the result of the fracture test satisfied the provisions of the standard.

EXAMPLE 3

The glassmaking operations of Example 1 were repeated except that the proportions of the raw materials were varied with the aim of a different glass composition.

The obtained glass contained, on a weight basis, 69.3% $SiO_2$, 1.8% $Al_2O_3$, 9.8% CaO, 3.3% MgO, 13.4% $Na_2O$, 1.0% $K_2O$, 0.685% total iron expressed as $Fe_2O_3$, 0.30% $CeO_2$, 0.12% $TiO_2$, 0.15% $SO_3$ and 55 ppm of MnO. The total of these components amounted to 99.919 wt %. The total of $SiO_2$, $Al_2O_3$ and $TiO_2$ amounted to 71.23 wt %. The total of CaO and MgO amounted to 13.1 wt %, and the total of $Na_2O$ and $K_2O$ amounted to 14.4 wt %. The degree of reduction of iron, $Fe^{2+}/Fe^{3+}$, was about 0.33.

The obtained glass had a greenish tint. At a thickness of 5 mm, the glass exhibited visible light (standard illuminant A) transmittance of about 71%, total solar radiation transmittance of about 42.5% and ultraviolet transmittance of about 13%. The dominant wavelength was about 514.9 nm, and the excitation purity was about 2.8.

The temperability of the obtained glass was tested by the same method as in Example 1. The tempering was accomplished without problem, and the result of the fracture test satisfied the provisions of the standard.

COMPARATIVE EXAMPLE 1

With the aim of a glass composition not in accordance with the invention the proportions of the raw materials used in Example 1 were varied. In this case MnO was not added, and the use of ilmenite was omitted. On these conditions the process of Example 1 was repeated.

The obtained glass contained, on a weight basis, 72.1% $SiO_2$, 1.5% $Al_2O_3$, 7.75% CaO, 3.56% MgO, 12.5% $Na_2O$, 1.1% $K_2O$, 0.753% total iron expressed as $Fe_2O_3$, 0.30% $CeO_2$, 0.25% $TiO_2$ and 0.18% $SO_3$. The total of these components amounted to 99.993 wt %. The total of $SiO_2$, $Al_2O_3$ and $TiO_2$ amounted to 73.85 wt %. The total of CaO and MgO amounted to 11.31 wt %, and the total of $Na_2O$ and $K_2O$ amounted to 13.6 wt%. The degree of reduction of iron, $Fe^{2+}/Fe^{3+}$, was about 0.33.

The obtained glass had a considerably deep and somewhat bluish green tint. At a thickness of 5 mm, the glass exhibited visible light (standard illuminant A) transmittance of about 68%, total solar radiation transmittance of about 39% and ultraviolet transmittance of about 13%. The dominant wavelength was about 510.5 nm, and the excitation purity was about 3.3.

The temperability of the obtained glass was tested by the same method as in Example 1. Compared with the glasses of Examples 1 to 3 this glass was inferior in temperability, and the result of the fracture test was not fully satisfactory.

COMPARATIVE EXAMPLE 2

With the aim of another glass composition not in accordance with the invention the proportions of the raw materials used in Comparative Example 1 were varied. On these conditions the process of Example 1 was repeated.

The obtained glass contained, on a weight basis, 67.0% $SiO_2$, 1.7% $Al_2O_3$, 9.45% CaO, 3.0% MgO, 16.1% $Na_2O$, 1.0% $K_2O$, 0.572% total iron expressed as $Fe_2O_3$, 0.22% $CeO_2$, 0.73% $TiO_2$ and 0.22% $SO_3$. The total of these components amounted to 99.992 wt %. The total of $SiO_2$, $Al_2O_3$ and $TiO_2$ amounted to 69.43 wt %. The total of CaO and MgO amounted to 12.45 wt %, and the total of $Na_2O$ and $K_2O$ amounted to 17.1 wt %. The degree of reduction of iron, $Fe^{2+}/Fe^{3+}$, was about 0.4.

The obtained glass had a greenish yellow tint. At a thickness of 5 mm, the glass exhibited visible light (standard illuminant A) transmittance of about 71%, total solar radiation transmittance of about 43% and ultraviolet transmittance of about 15%. The dominant wavelength was about 538.6 nm, and the excitation purity was about 4.2.

The temperability of the obtained glass was tested by the same method as in Example 1. Compared with the glasses of Examples 1 to 3 this glass was inferior in temperability, and the result of the fracture test was not fully satisfactory.

EXAMPLE 4

Industrial materials were used as raw materials of glass. That is, silica sand, feldspar, soda ash, dolomite, limestone, mirabelite, titanium oxide, cerium carbonate, ilmenite and manganese oxide were weighed and mixed aiming at a prescribed glass composition, and a small quantity of carbon was added to the mixture. The glass composition was formulated such that the viscosity-temperature becomes about 650°-685° C. at $10^9$ poise and about 555°-585° C. at $10^{12}$ poise and such that the difference between the two temperatures becomes about 90°-103° C. The mixture was melted in a conventional furnace in a sheet glass manufacturing plant. The molten glass was refined and homogenized in the usual manner and then formed into a sheet glass having a thickness of about 5 mm by the float process. The glass sheet was cut into 100 mm × 100 mm square samples.

By chemical analysis, the obtained glass contained, on a weight basis, 70.0% $SiO_2$, 1.8% $Al_2O_3$, 9.1% CaO, 3.6% MgO, 13.4% $Na_2O$, 0.7% $K_2O$, 0.620% total iron expressed as $Fe_2O_3$, 0.31% $CeO_2$, 0.20% $TiO_2$, 0.14% $SO_3$ and 270 ppm of MnO. The total of these components amounted to 99.90 wt %. The total of $SiO_2$, $Al_2O_3$ and $TiO_2$ amounted to 72.1 wt %. The total of CaO and MgO amounted to 12.7 wt %, and the total of $Na_2O$ and $K_2O$ amounted to 14.1 wt %. The degree of reduction of iron, $Fe^{2+}/Fe^{3+}$, was about 0.50.

The obtained glass had a relatively palely greenish tint. At a thickness of 5 mm, the glass exhibited visible light (standard illuminant A) transmittance of about 71%, total solar radiation transmittance of about 43% and ultraviolet transmittance of about 13%. In the wavelength range of from 1000 to 1150 nm an average transmittance was about 13.5%. The dominant wavelength was about 509 nm, and the excitation purity was about 3.3.

The viscosity-temperatures of the obtained glass were as aimed, and the difference between the softening temperature and the strain point was about 200°-240° C. For testing temperability the same glass was formed into glass sheets 120 mm × 100 mm in widths and about 3.5 mm in thickness, and each glass sheet was tempered by the same method as in Example 1. The tempering was accomplished without problem, and the result of the fracture test satisfied the requirements of JIS R 3111.

EXAMPLE 5

The process of Example 4 was repeated except that the proportions of the raw materials were slightly varied.

The obtained glass contained, on a weight basis, 70.2% $SiO_2$, 1.8% $Al_2O_3$, 9.1% CaO, 3.5% MgO, 13.5% $Na_2O$, 0.6% $K_2O$, 0.623% total iron expressed as $Fe_2O_3$, 0.31% $CeO_2$, 0.19% $TiO_2$, 0.13% $SO_3$ and 290 ppm of MnO. The total of these components amounted to 99.983 wt %. The total of $SiO_2$, $Al_2O_3$ and $TiO_2$ amounted to 72.19 wt %. The total of CaO and MgO amounted to 12.6 wt %, and the total of $Na_2O$ and $K_2O$ amounted to 14.1 wt %. The degree of reduction of iron, $Fe^{2+}/Fe^{3+}$, was about 0.50.

The obtained glass had a relatively palely greenish tint. At a thickness of 5 mm, the glass exhibited visible light (standard illuminant A) transmittance of about 71%, total solar radiation transmittance of about 42% and ultraviolet transmittance of about 13%. In the wavelength range of from 1000 to 1150 nm an average transmittance was about 13.5%. The dominant wavelength was about 510 nm, and the excitation purity was about 3.4.

The temperability of the obtained glass was tested by the same method as in Example 1. The tempering was accomplished without problem, and the result of the fracture test was satisfactory.

EXAMPLE 6

The process of Example 4 was repeated except that the proportions of the raw materials were varied.

The obtained glass contained, on a weight basis, 69.9% $SiO_2$, 1.8% $Al_2O_3$, 9.1% CaO, 3.6% MgO, 13.5% $Na_2O$, 0.6% $K_2O$, 0.690% total iron expressed as $Fe_2O_3$, 0.40% $CeO_2$, 0.23% $TiO_2$, 0.11% $SO_3$ and 250 ppm of MnO. The total of these components amounted to 99.960 wt %. The total of $SiO_2$, $Al_2O_3$ and $TiO_2$ amounted to 71.93 wt %. The total of CaO and MgO amounted to 12.7 wt %, and the total of $Na_2O$ and $K_2O$ amounted to 14.1 wt %. The degree of reduction of iron, $Fe^{2+}/Fe^{3+}$, was about 0.52.

The obtained glass had a relatively deeply greenish tint. At a thickness of 5 mm, the glass exhibited visible light (standard illuminant A) transmittance of about 68%, total solar radiation transmittance of about 38% and ultraviolet transmittance of about 9.5%. In the wavelength range of from 1000 to 1150 nm an average transmittance was about 9.4%. The dominant wavelength was about 508 nm, and the excitation purity was about 4.3.

The temperability of the obtained glass was tested by the same method as in Example 1. The tempering was accomplished without problem, and the result of the fracture test was satisfactory.

EXAMPLE 7

The process of Example 4 was repeated except that the proportions of the raw materials were varied.

The obtained glass contained, on a weight basis, 69.7% $SiO_2$, 1.9% $Al_2O_3$, 9.1% CaO, 3.6% MgO, 13.5% $Na_2O$, 0.6% $K_2O$, 0.686% total iron expressed as $Fe_2O_3$, 0.40% $CeO_2$, 0.24% $TiO_2$, 0.12% $SO_3$ and 260 ppm of MnO. The total of these components amounted to 99.876 wt %. The total of $SiO_2$, $Al_2O_3$ and $TiO_2$ amounted to 71.74 wt %. The total of CaO and MgO amounted to 12.7 wt %, and the total of $Na_2O$ and $K_2O$ amounted to 14.1 wt %. The degree or reduction or iron, $Fe^{2+}/Fe^{3+}$, was about 0.53.

The obtained glass had a relatively deeply greenish tint. At a thickness of 5 mm, the glass exhibited visible light (standard illuminant A) transmittance of about 68%, total solar radiation transmittance of about 38% and ultraviolet transmittance of about 9.5%. In the wavelength range of from 1000 to 1150 nm an average transmittance was about 9.7%. The dominant wavelength was about 508 nm, and the excitation purity was about 4.4.

The temperability of the obtained glass was tested by the same method as in Example 1. The tempering was accomplished without problem, and the result of the fracture test was satisfactory.

Experimental windshields for an automobile were produced by using the infrared and ultraviolet absorbing glasses of Examples 1, 4 and 6. Each of these glasses was formed into a glass sheet having a thickness of about 2.5 mm, and the glass sheet was bent by heating and pressing. An ordinary glass sheet having a thickness of about 2 mm was similarly bent, and a conventional heat reflecting coating was made on the convex side of the bent glass sheet. Then the infrared and ultraviolet absorbing glass sheet and the glass sheet having the coating were laminated by interposing a polyvinyl butyral film between the two glass sheets. The resultant laminated glass was tested as an automobile windshield. In this windshield of laminated glass the infrared and ultraviolet absorbing glass sheet was on the outboard side, and the heat reflecting coating on the glass sheet on the inboard side was in contact with the polyvinyl butyral film. With respect to any of Examples 1, 4 and 6, the experimental windshield proved to be satisfactory in visibility through it and effective for improvement in habitability of the car interior.

What is claimed is:

1. A green-colored infrared and ultraviolet ray absorbing glass comprising as essential components, on a weight basis, 68–72% of $SiO_2$, 1.6–3.0% of $Al_2O_3$, 8.5–11.0% of CaO, 2.0–4.2% of MgO, 12.0–16.0% of $Na_2O$, 0.5–3.0% of $K_2O$, 0.08–0.30% of $SO_3$, 0.58–0.80% of total iron expressed as $Fe_2O_3$, 0.10–0.60% of $CeO_2$, 0.10–0.40% of $TiO_2$ and 5–350 ppm of MnO, with provisos that the total of said essential ingredients amounts to at least 98 wt % of the glass, that the total amount of $SiO_2$, $Al_2O_3$ and $TiO_2$ is from 70.0 to 74.0%, that the total amount CaO and MgO is from 12.0 to 15.0%, that the total amount of $Na_2O$ and $K_2O$ is from 13.0 to 17.0% and that said total iron includes ferrous iron and ferric iron, the weight ratio of said ferrous iron to said ferric iron, $Fe^{2+}/Fe^{3+}$, is in the range from 0.40 to 0.70.

2. A glass according to claim 1, wherein the weight ratio of said ferrous iron to said ferric iron, $Fe^{2+}/Fe^{3+}$, is in the range from 0.45 to 0.70.

3. A glass according to claim 2, wherein said weight ratio of ferrous iron to ferric iron is in the range from 0.50 to 0.65.

4. A glass according to claim 1, wherein the amount of said total iron expressed as $Fe_2O_3$ is in the range from 0.60 to 0.71 wt %.

5. A glass according to claim 4, wherein the amount of said $CeO_2$ is in the range from 0.2 to 0.35 wt % and the amount of said $TiO_2$ is in the range from 0.1 to 0.2 wt %.

6. A glass according to claim 1, wherein the amount of said $SO_3$ is in the range from 0.10 to 0.18 wt %.

7. A glass according to claim 1, wherein the glass at a thickness of 5 mm is not lower than 67% in visible light transmittance using the standard illuminant A, from 30 to 47% in total solar radiation transmittance, from 7 to 15% in ultraviolet radiation transmittance, from 505 to 518 nm in dominant wavelength and not higher than 5.5 in excitation purity.

8. A green-colored infrared and ultraviolet ray absorbing glass comprising as essential components, on a weight basis, 68–72% of $SiO_2$, 1.6–3.0% of $Al_2O_3$, 8.5–11.0% of CaO, 2.0–4.2% of MgO, 12.0–16.0% of $Na_2O$, 0.5–3.0% of $K_2O$, 0.8–0.30% of $SO_3$, 0.65–0.75% of total iron expressed as $Fe_2O_3$, 0.20–0.35% of $CeO_2$, 0.10–0.20% of $TiO_2$ and 5–300 ppm of MnO, with provisos that the total of said essential ingredients amounts to at least 98 wt % of the glass, that the total amount of $SiO_2$, $Al_2O_3$ and $TiO_2$ is from 70.0 to 74.0%, that the total amount CaO and MgO is from 12.0 to 15.0%, that the total amount of $Na_2O$ and $K_2O$ is from 13.0 to 17.0% and that said total iron includes ferrous iron and ferric iron, the weight ratio of said ferrous iron to said ferric iron, $Fe^{2+}/Fe^{3+}$, is in the range from 0.40 to 0.70.

9. A glass according to claim 8, wherein the weight ratio of said ferrous iron to said ferric iron, $Fe^{2+}/Fe^{3+}$, is in the range from 0.45 to 0.70.

10. A green-colored infrared and ultraviolet ray absorbing glass comprising as essential components, on a weight basis, 68–72% of $SiO_2$, 1.6–3.0% of $Al_2O_3$, 8.5–11.0% of CaO, 2.0–4.2% of MgO, 12.0–16.0% of $Na_2O$, 0.5–3.0% of $K_2O$, 0.08–0.30% of $SO_3$, 0.58–0.65% of total iron expressed as $Fe_2O_3$, 0.10–0.50% of $CeO_2$, 0.10–0.40% of $TiO_2$ and 5–350 ppm of MnO, with provisos that the total of said essential ingredients amounts to at least 98 wt % of the glass, that the total amount of $SiO_2$, $Al_2O_3$ and $TiO_2$ is from 70.0 to 74.0%, that the total amount CaO and MgO is from 12.0 to 15.0%, that the total amount of $Na_2O$ and $K_2O$ from 13.0 to 17.0% and that said total iron includes ferrous iron and ferric iron, the weight ratio of said ferrous iron to said ferric iron, $Fe^{2+}/Fe^{3+}$, is in the range from 0.40 to 0.70.

11. A glass according to claim 10, wherein the weight ratio of said ferrous iron to said ferric iron, $Fe^{2+}/Fe^{3+}$, is in the range from 0.45 to 0.70.

12. A glass according to claim 11, wherein said weight ratio of ferrous iron to ferric iron is in the range from 0.50 to 0.65.

13. A green-colored infrared and ultraviolet ray absorbing glass comprising as essential components, on a weight basis, 68–72% of $SiO_2$, 1.6–3.0% of $Al_2O_3$, 8.5–11.0% of CaO, 2.0–4.2% of MgO, 12.0–16.0% of $Na_2O$, 0.5–3.0% of $K_2O$, 0.08–0.30% of $SO_3$, 0.65–0.80% of total iron expressed as $Fe_2O_3$, 0.35–0.60% of $CeO_2$, 0.15–0.40% of $TiO_2$ and 5–350 ppm of MnO, with provisos that the total of said essential ingredients amounts to at least 98 wt % of the glass, that the total amount of $SiO_2$, $Al_2O_3$ and $TiO_2$ is from 70.0 to 74.0%, that the total amount CaO and MgO is from 12.0 to 15.0%, that the total amount of $Na_2O$ and $K_2O$ is from 13.0 to 17.0% and that said total iron includes ferrous iron and ferric iron, the weight ratio of said ferrous iron to said ferric iron, $Fe^{2+}/Fe^{3+}$, is in the range from 0.40 to 0.70.

14. A glass according to claim 13, wherein the weight ratio of said ferrous iron to said ferric iron, $Fe^{2+}/Fe^{3+}$, is in the range from 0.45 to 0.70.

15. A glass according to claim 14, wherein said weight ratio of ferrous iron to ferric iron is in the range from 0.50 to 0.65.

* * * * *